US012720329B2

(12) United States Patent
Bai et al.

(10) Patent No.: US 12,720,329 B2
(45) Date of Patent: Aug. 25, 2026

(54) ACTIVATING A BEAM REPORT CONFIGURATION BASED AT LEAST IN PART ON A TRIGGERING EVENT

(71) Applicant: QUALCOMM Incorporated, San Diego, CA (US)

(72) Inventors: Tianyang Bai, Somerville, NJ (US); Yan Zhou, San Diego, CA (US); Hua Wang, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 858 days.

(21) Appl. No.: 18/048,682

(22) Filed: Oct. 21, 2022

(65) Prior Publication Data

US 2024/0137780 A1 Apr. 25, 2024
US 2024/0236703 A9 Jul. 11, 2024

(51) Int. Cl.
*H04W 16/28* (2009.01)
*H04W 24/10* (2009.01)

(52) U.S. Cl.
CPC .......... *H04W 16/28* (2013.01); *H04W 24/10* (2013.01)

(58) Field of Classification Search
CPC ..... H04W 16/28; H04W 24/10; H04W 72/23; H04W 76/15
See application file for complete search history.

(56) References Cited

U.S. PATENT DOCUMENTS

2021/0345191 A1* 11/2021 Da Silva .............. H04B 7/0695
2024/0056844 A1* 2/2024 Zhu ...................... H04W 16/28

* cited by examiner

*Primary Examiner* — Sam Bhattacharya
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a network node, an event trigger request based at least in part on an occurrence of a triggering event, the event trigger request activating a beam report configuration at the UE in lieu of a machine learning (ML) model for beam prediction at the UE. The UE may transmit, to the network node, a beam measurement report based at least in part on the beam report configuration. Numerous other aspects are described.

30 Claims, 14 Drawing Sheets

400

500

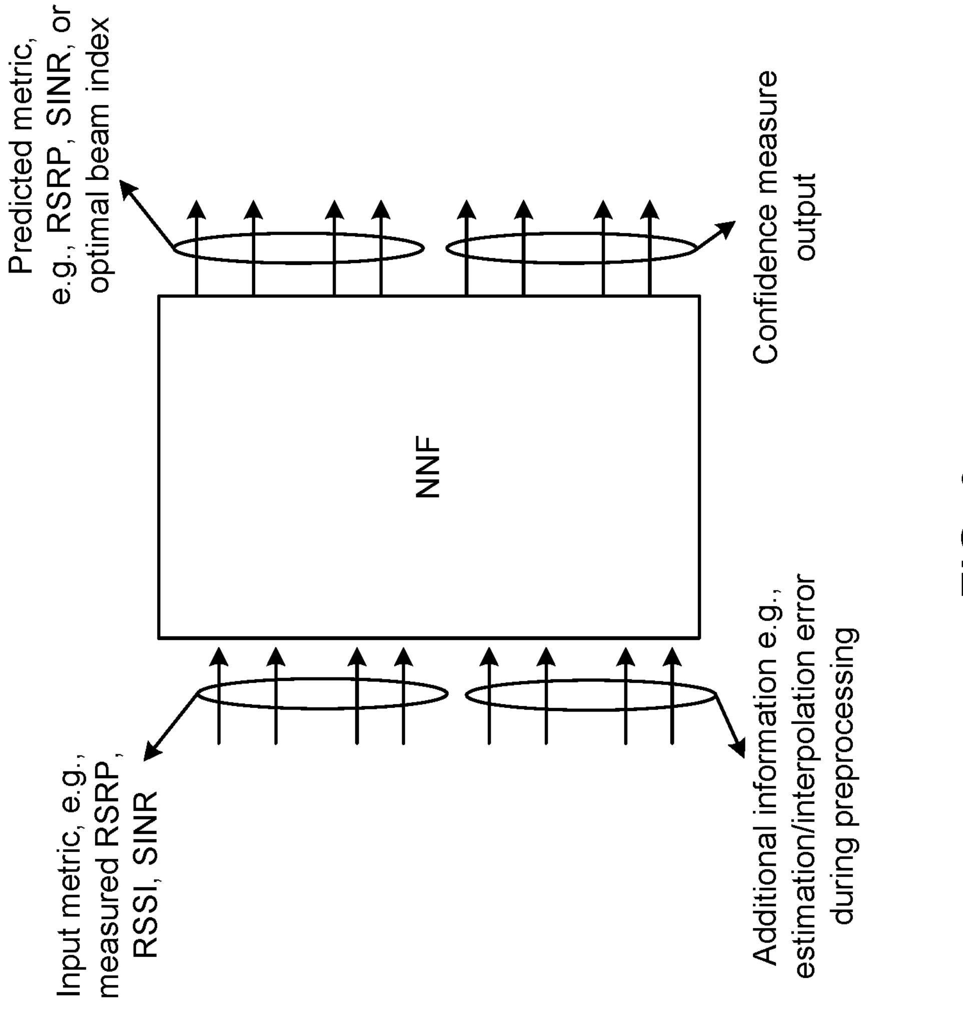
600

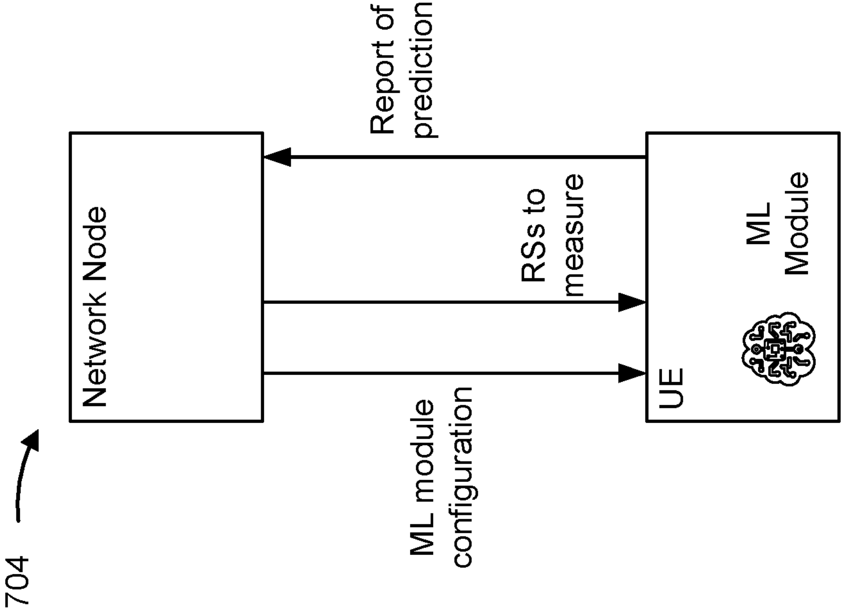
FIG. 7
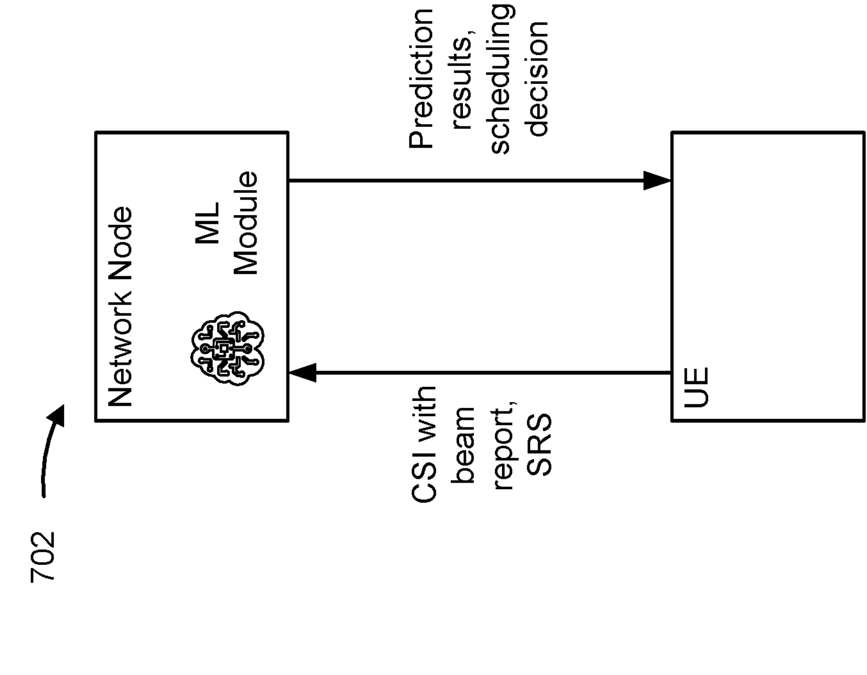

1100
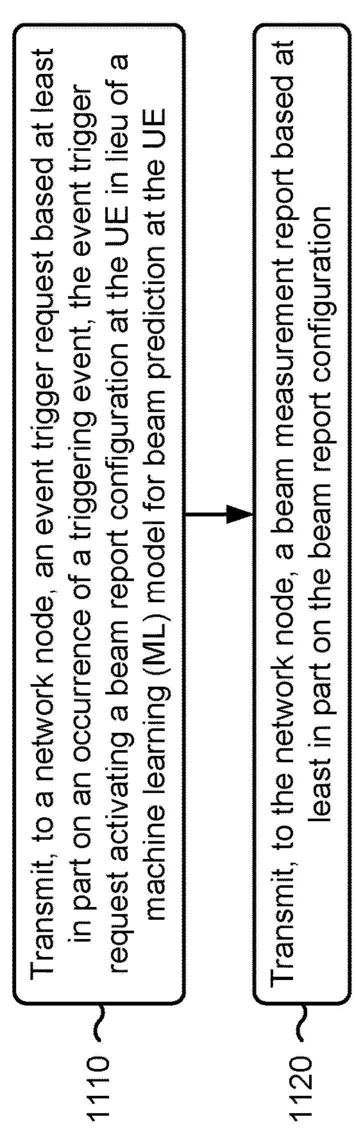
FIG. 11

1200

ACTIVATING A BEAM REPORT CONFIGURATION BASED AT LEAST IN PART ON A TRIGGERING EVENT

FIELD OF THE DISCLOSURE

Aspects of the present disclosure generally relate to wireless communication and to techniques and apparatuses for activating a beam report configuration based at least in part on a triggering event.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: transmit, to a network node, an event trigger request based at least in part on an occurrence of a triggering event, the event trigger request activating a beam report configuration at the UE in lieu of a machine learning (ML) model for beam prediction at the UE; and transmit, to the network node, a beam measurement report based at least in part on the beam report configuration.

In some implementations, an apparatus for wireless communication at a network node includes a memory and one or more processors, coupled to the memory, configured to: receive, from a UE, an event trigger request based at least in part on an occurrence of a triggering event, the event trigger request activating a beam report configuration at the UE in lieu of an ML model for beam prediction at the UE; and receive, from the UE, a beam measurement report based at least in part on the beam report configuration.

In some implementations, a method of wireless communication performed by an apparatus of a UE includes transmitting, to a network node, an event trigger request based at least in part on an occurrence of a triggering event, the event trigger request activating a beam report configuration at the UE in lieu of an ML model for beam prediction at the UE; and transmitting, to the network node, a beam measurement report based at least in part on the beam report configuration.

In some implementations, a method of wireless communication performed by an apparatus of a network node includes receiving, from a UE, an event trigger request based at least in part on an occurrence of a triggering event, the event trigger request activating a beam report configuration at the UE in lieu of an ML model for beam prediction at the UE; and receiving, from the UE, a beam measurement report based at least in part on the beam report configuration.

In some implementations, a non-transitory computer-readable medium storing a set of instructions for wireless communication includes one or more instructions that, when executed by one or more processors of a UE, cause the UE to: transmit, to a network node, an event trigger request based at least in part on an occurrence of a triggering event, the event trigger request activating a beam report configuration at the UE in lieu of an ML model for beam prediction at the UE; and transmit, to the network node, a beam measurement report based at least in part on the beam report configuration.

In some implementations, a non-transitory computer-readable medium storing a set of instructions for wireless communication includes one or more instructions that, when executed by one or more processors of a network node, cause the network node to: receive, from a UE, an event trigger request based at least in part on an occurrence of a triggering event, the event trigger request activating a beam report configuration at the UE in lieu of an ML model for beam prediction at the UE; and receive, from the UE, a beam measurement report based at least in part on the beam report configuration.

In some implementations, an apparatus for wireless communication includes means for transmitting, to a network node, an event trigger request based at least in part on an occurrence of a triggering event, the event trigger request activating a beam report configuration at the apparatus in lieu of an ML model for beam prediction at the apparatus; and means for transmitting, to the network node, a beam measurement report based at least in part on the beam report configuration.

In some implementations, an apparatus for wireless communication includes means for receiving, from a UE, an event trigger request based at least in part on an occurrence of a triggering event, the event trigger request activating a beam report configuration at the UE in lieu of an ML model for beam prediction at the UE; and means for receiving, from the UE, a beam measurement report based at least in part on the beam report configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of an NNF for beam prediction, in accordance with the present disclosure.

FIG. 7 is a diagram illustrating an example of a machine learning (ML) model for beam prediction, in accordance with the present disclosure.

FIGS. 11-12 are diagrams illustrating example processes associated with activating a beam report configuration based at least in part on a triggering event, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
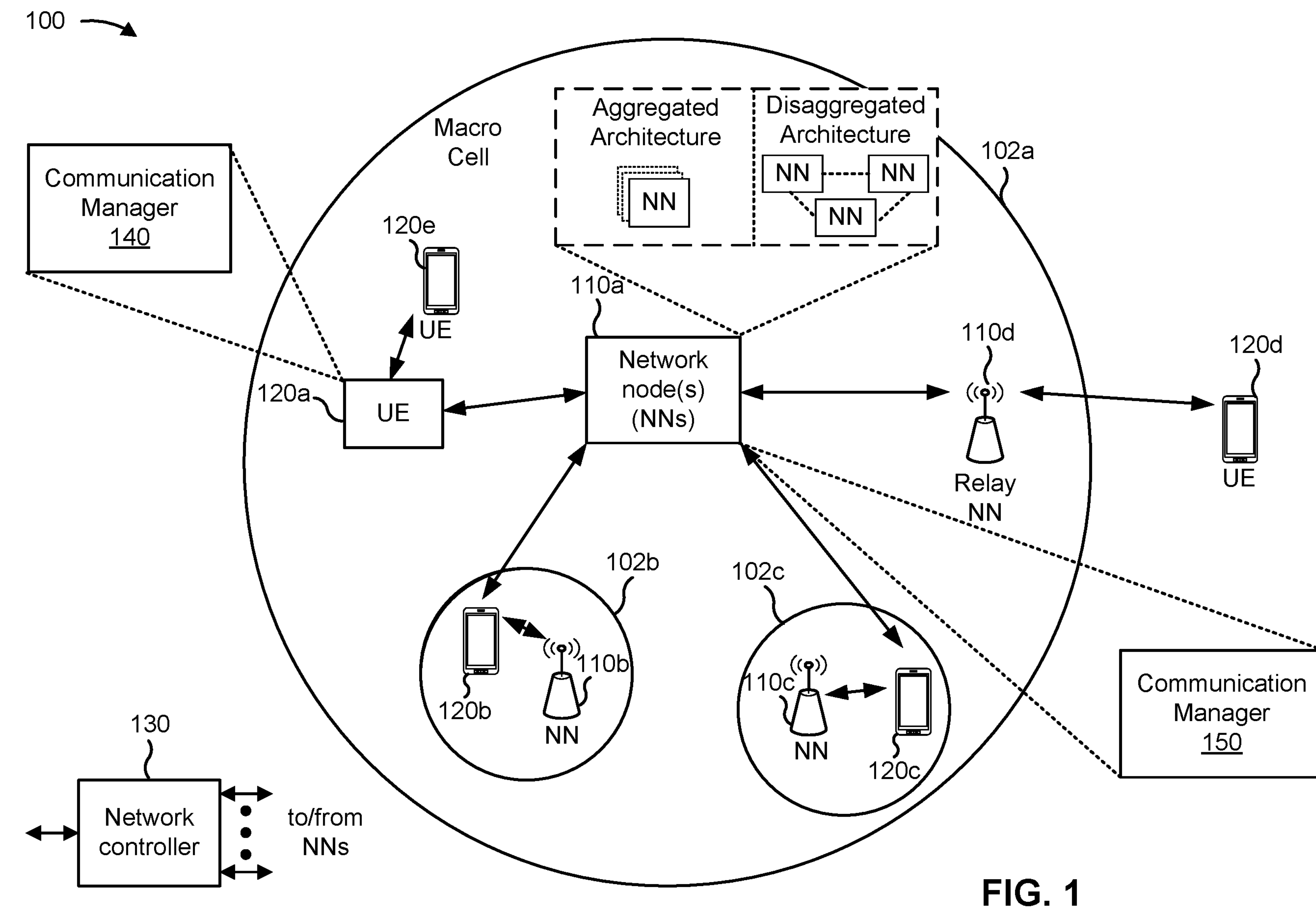
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may transmit, to a network node, an event trigger request based at least in part on an occurrence of a triggering event, the event trigger request activating a beam report configuration at the UE in lieu of a machine learning (ML) model for beam prediction at the UE; and transmit, to the network node, a beam measurement report based at least in part on the beam report configuration. Additionally, or alternatively, the communication manager 140 may perform one or more other operations described herein.

In some aspects, a network node (e.g., network node 110) may include a communication manager 150. As described in more detail elsewhere herein, the communication manager 150 may receive, from a UE, an event trigger request based at least in part on an occurrence of a triggering event, the event trigger request activating a beam report configuration at the UE in lieu of an ML model for beam prediction at the UE; and receive, from the UE, a beam measurement report based at least in part on the beam report configuration. Additionally, or alternatively, the communication manager 150 may perform one or more other operations described herein.

As indicated above, FIG. 1 is provided as an example. Other examples may differ from what is described with regard to FIG. 1.

Figure 2:
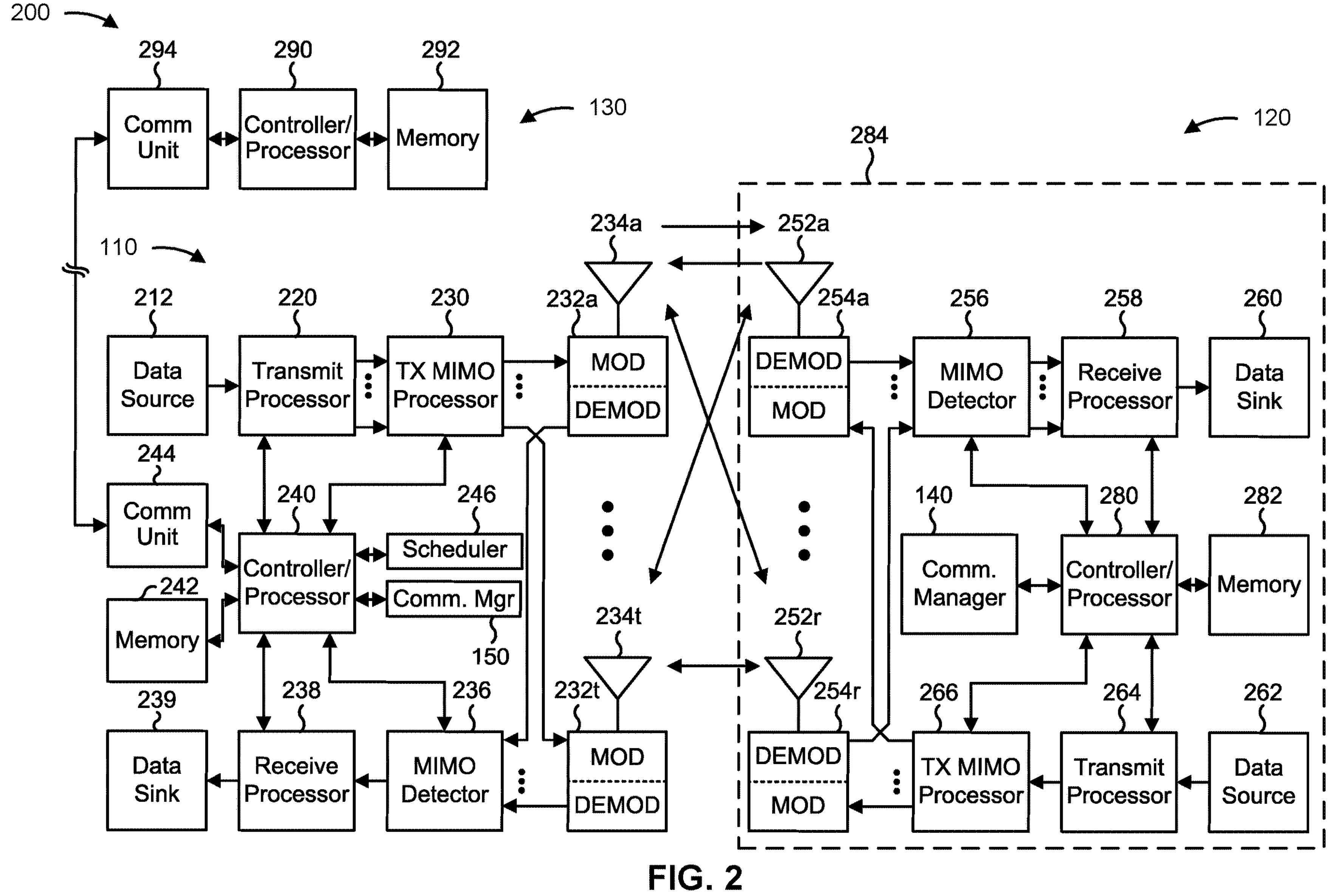
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the network node 110, the controller/processor 280 of the UE 120, and/or any other component(s) of FIG. 2 may perform one or more techniques associated with activating a beam report configuration based at least in part on a triggering event, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting, to a network node, an event trigger request based at least in part on an occurrence of a triggering event, the event trigger request activating a beam report configuration at the UE in lieu of an ML model for beam prediction at the UE; and/or means for transmitting, to the network node, a beam measurement report based at least in part on the beam report configuration. In some aspects, the means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for receiving, from a UE, an event trigger request based at least in part on an occurrence of a triggering event, the event trigger request activating a beam report configuration at the UE in lieu of an ML model for beam prediction at the UE; and/or means for receiving, from the UE, a beam measurement report based at least in part on the beam report configuration. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
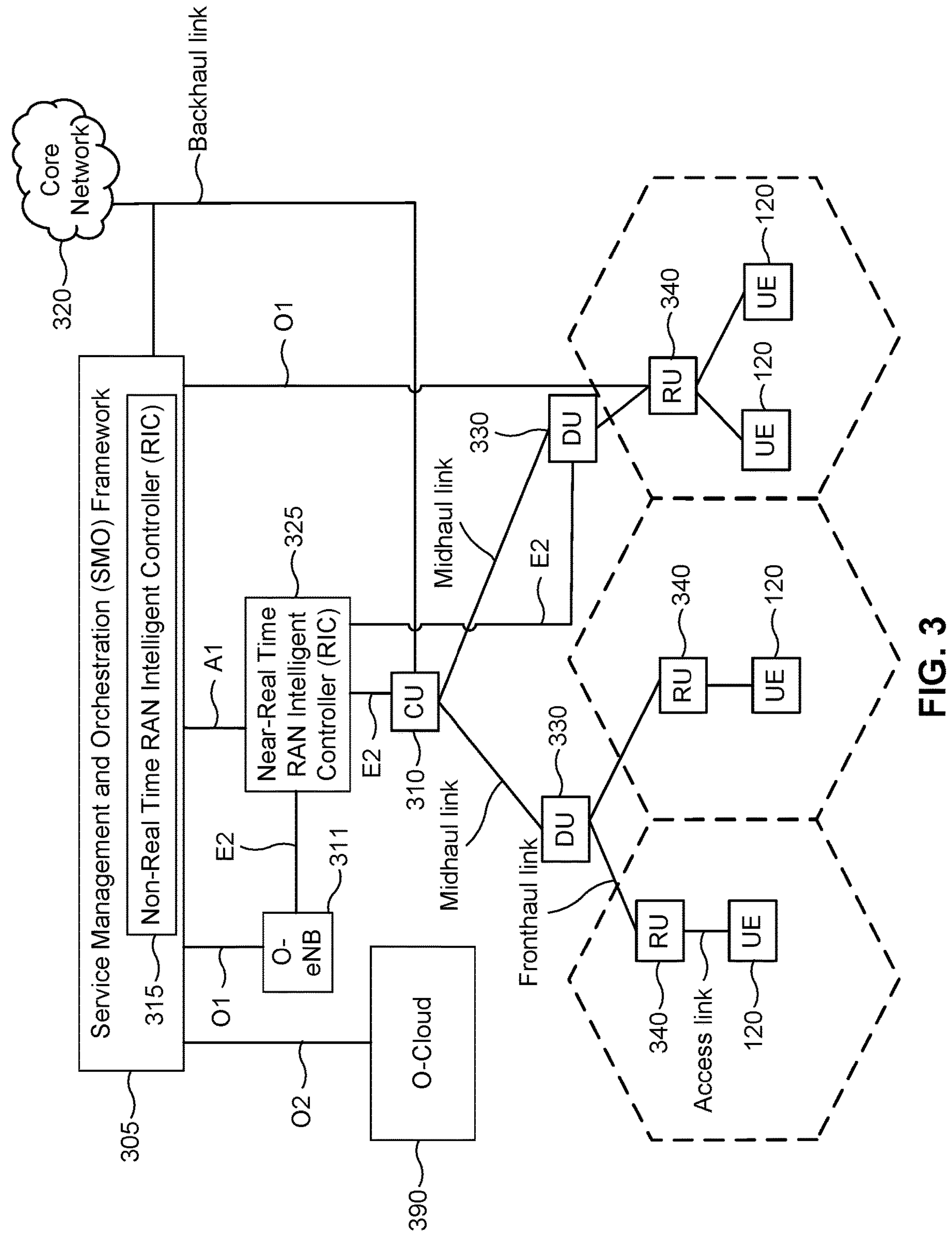
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

AI/ML for an air interface may be applicable to various use cases, such as channel state information (CSI) feedback enhancements (e.g., overhead reduction, improved accuracy, and/or prediction), beam management (e.g., beam prediction in time, and/or spatial domain for overhead and latency reduction, or beam selection accuracy improvement), and/or positioning accuracy enhancements for different scenarios (e.g., heavy non-line-of-sight (NLOS) conditions). An AI/ML framework may involve capability indications, configuration procedures (e.g., training and/or inference), validation and testing procedures, and management of data and an AI/ML model. AI/ML for a next generation (NG)-RAN may involve specifying data collection enhancements and signaling support over current NG-RAN interfaces and architecture (e.g., non-split architecture and split architecture) for AWL-based network energy saving, load balancing, and mobility optimization. Network entities and interface procedures may support data management and model management, which may include multi-vendor interoperability between different AI/ML functions (e.g., data collection, model training, and/or model inference), and/or an integration and collaboration of operations, administration, and maintenance (OAM) AI/ML, 5G core (5GC) AI/ML, NG-RAN AI/ML, and air interface AI/ML.

Figure 4:
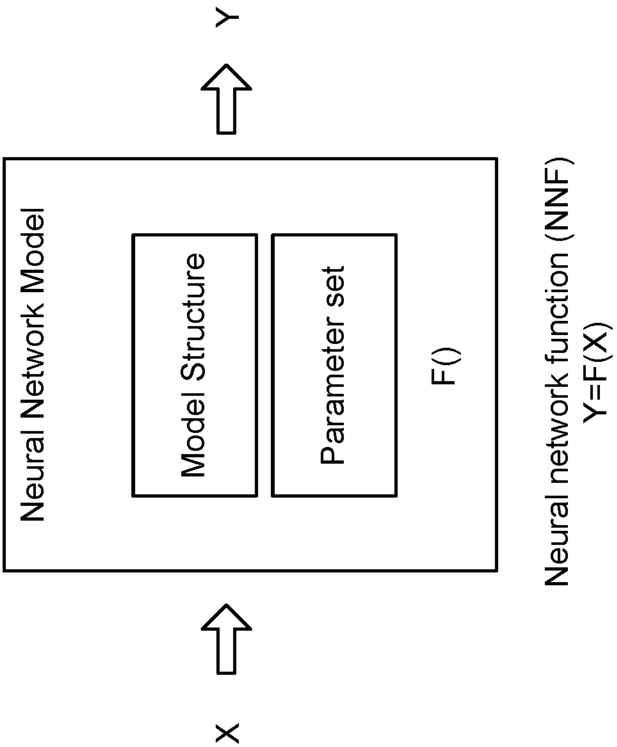
FIG. 4 is a diagram illustrating an example of a neural network function (NNF) supported by a neural network model, in accordance with the present disclosure.

FIG. 4 is a diagram illustrating an example 400 of a neural network function supported by a neural network model, in accordance with the present disclosure.

As shown in FIG. 4, a neural network function (NNF) of Y=F(X) may be supported by a neural network model, where X is an input to the neural network model and Y is an output of the neural network model. Each NNF may be identified by a standardized NNF identifier (ID). Non-standardized IDs of NNFs may be allowed for private extensions. A standardized input X and output Y may be used for each NNF. Mandatory information elements (IEs) may be used for inter-vendor interworking, and optional IEs may be used for flexible implementations. One NNF may be supported by multiple models (e.g., a vendor specific implementation). The neural network model may be defined as a model structure and as a parameter set. The neural network model may be defined by an operator, an infra vendor, or a third party (e.g., an original equipment manufacturer (OEM)). The model structure may be identified by a model ID, which may include a default parameter set. The model ID may be unique in a network. Each model ID may be associated with an NNF. The parameter set may include weights of the neural network model and other configuration parameters. The parameter set may be location specific and/or configuration specific.

As indicated above, FIG. 4 is provided as an example. Other examples may differ from what is described with regard to FIG. 4.

Figure 5:
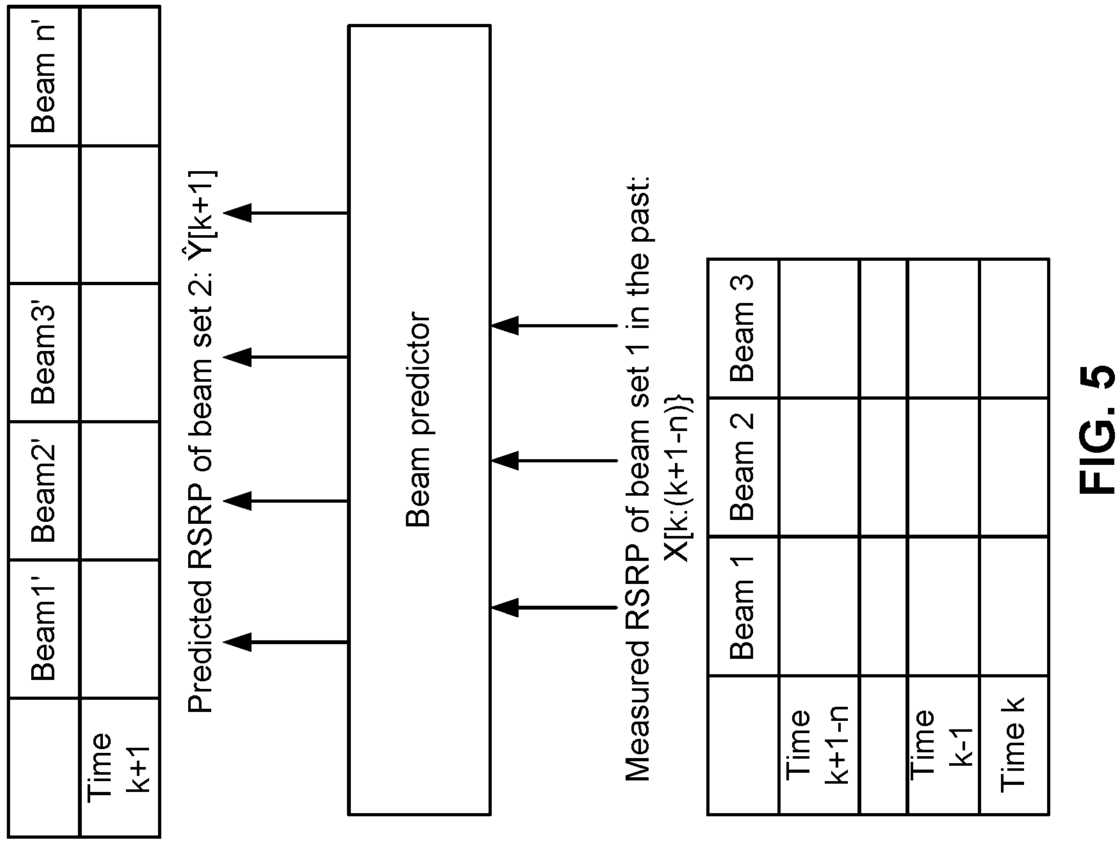
FIG. 5 is a diagram illustrating an example of beam prediction, in accordance with the present disclosure.

FIG. 5 is a diagram illustrating an example 500 of beam prediction, in accordance with the present disclosure.

As shown in FIG. 5, a beam prediction model (or beam prediction algorithm) may be trained to predict future RSRP measurements of a second beam set based at least in part on past RSRP measurements of a first beam set. The past RSRP measurements of the first beam set (X) may be represented by X[k:(k+1−n)]. The predicted future RSRP measurements of the second beam set (V) may be represented by $\hat{Y}[k+1]$. The beam prediction model may be based at least in part on a recursive neural network or a traditional algorithm. The beam prediction model may be trained and maintained by a network node. The beam prediction model may be run by the network node and/or a UE. When the beam prediction model is run by the UE, the network node may configure the beam prediction model at the UE. The first beam set and the second beam set may include the same beams, overlapping beams, or totally different beams. Synchronization signal blocks (SSBs) (or a subset of SSBs) may be measured to predict a plurality of SSBs in the future. SSBs may be measured to predict some refined channel state information reference signal (CSI-RS) beams for a unicast physical downlink shared channel (PDSCH) or a unicast physical downlink control channel (PDCCH). Alternatively, an output of the beam prediction model may be a best beam ID at a future time or some other related metric at a future time.

The beam prediction model may save a reference signal overhead because reference signals may be transmitted less frequently to track beams/channels, as compared to a non-beam-prediction-model approach. The beam prediction model may save uplink feedback because the UE may be able to transmit channel estimation feedback less frequently, as compared to the non-beam-prediction-model approach. The beam prediction model may save UE power because the UE may be able to perform measurements and feedback less frequently, as compared to the non-beam-prediction-model approach.

As indicated above, FIG. 5 is provided as an example. Other examples may differ from what is described with regard to FIG. 5.

FIG. 6 is a diagram illustrating an example 600 of an NNF for beam prediction, in accordance with the present disclosure.

As shown in FIG. 6, an NNF may receive an input metric, such as RSRP measurements, RSSI measurements, and/or signal-to-interference-plus-noise ratio (SINR) measurements. The NNF may receive additional information, such as an estimation or interpolation error during preprocessing. Additional information input may be optional and may include a time stamp, an indication of whether a corresponding RSRP input is measured or not, an error in a corresponding RSRP input, and/or an expected error due to an interpolation or measurement. The NNF may output a predicted metric, such as a predicted RSRP measurement or a predicted SINR measurement. The NNF may output an optimal beam index. The NNF may output a confidence measure (or confidence level), which may be associated with the predicted metric or the optimal beam index. A confidence measure output may be optional and may include various types of metrics for confidence measure, such as a standard deviation, a variance, a confidential range given a predefined confidence level, and/or a failure probability. Further, each input/output port may be further associated with an SSB or CSI-RS resource (or SSB or CSI-RS resource set) or a transmission configuration indicator (TCI). For example, an output may correspond to an RSRP and a standard deviation of SSB ID 1-10.

As indicated above, FIG. 6 is provided as an example. Other examples may differ from what is described with regard to FIG. 6.

FIG. 7 is a diagram illustrating an example 700 of an ML model for beam prediction, in accordance with the present disclosure.

As shown by reference number 702, an ML model for beam prediction may run at a network node. A UE may feed back CSI with a beam report. The UE may feed back a sounding reference signal (SRS). The network node may run the ML model for beam prediction based at least in part on feedback received from the UE. The network node may determine a beam prediction result using the ML model for beam prediction. The network node may perform a scheduling decision for the UE based at least in part on the beam prediction result. The ML model for beam prediction may be run at the network node when the UE is power and/or computation limited.

As shown by reference number 704, an ML model for beam prediction may be run at a UE. The ML model for beam prediction may be configured by a network node. The UE may run the ML model for beam prediction based at least in part on local measurements and signaling from the network node. The UE may report, to the network node, a beam prediction result based at least in part on a configuration or triggering condition. The UE may run the ML model for beam prediction because the UE may generally have more measurement results, as compared to the network node, and running the ML model for beam prediction at the UE may involve less overhead for reporting. However, running the ML model for beam prediction at the UE may involve a higher computation capability at the UE.

As indicated above, FIG. 7 is provided as an example. Other examples may differ from what is described with regard to FIG. 7.

A UE may run an ML model for beam prediction. In some cases, the UE may follow a certain trajectory that is associated with error regions. When the UE enters an error region, a prediction error associated with an output of the ML model for beam prediction may satisfy a threshold (e.g., the prediction error may be greater than the threshold). However, in these cases, the UE may continue to use the ML model for beam prediction, with an assumption that the prediction error is likely to improve as the UE continues to follow the trajectory and exits the error region. When the UE continues to use the ML model for beam prediction that outputs beam predictions with high prediction errors, the UE may use predicted beams that are associated with high error, thereby degrading a performance of the UE.

In various aspects of techniques and apparatuses described herein, a UE may transmit, to a network node, an event trigger request based at least in part on an occurrence of a triggering event. The event trigger request may activate a beam report configuration at the UE in lieu of an ML model for beam prediction at the UE. When the beam report configuration is activated, the ML model for beam prediction may be temporarily deactivated or disabled. In some cases, the ML model for beam prediction may not be deactivated or disabled, but a subsequent output of the ML model for beam prediction may be ignored by the UE, and the UE may continue to use the beam report configuration. The triggering event may occur based at least in part on an amount of error associated with an output of the ML model for beam prediction satisfying a threshold. The triggering event may occur based at least in part on a confidence level associated with an output of the ML model for beam prediction satisfying a threshold. The UE may transmit, to the network node, a beam measurement report based at least in part on the beam report configuration. When the beam report configuration is activated, the UE may stop performing a beam-prediction-based procedure, and the UE may instead start performing a beam-measurement-based procedure. As a result, the UE may at least temporarily no longer use the ML model for beam prediction providing outputs associated with relatively high rates of error and/or relatively low confidence levels, thereby improving a performance of the UE.

In some aspects, the UE may run the ML model for beam prediction. The ML model for beam prediction may be configured by the network node at the UE. The UE may monitor a performance of the ML model for beam prediction. The UE may transmit, to the network node, the event trigger request when a prediction error associated with the ML model for beam prediction satisfies a threshold. The UE may transmit the event trigger request in case a relatively large prediction error is observed. The UE may be configured to perform a performance monitoring, in which the UE may measure certain reference signals and compare actual measurements associated with these reference signals to predicted RSRP measurements. Depending on the comparison, the UE may determine the prediction error. A report of a relatively large prediction error may trigger the UE to fall back to the beam-measurement-based procedure. The UE may perform the beam-measurement-based procedure until the beam-prediction-based procedure is reactivated by the network node. The beam-measurement-based procedure (e.g., the fallback procedure) may require a different (e.g., more frequent) report as compared to the beam-prediction-based procedure. The beam-measurement-based procedure may be associated with a beam reporting.

In some aspects, to reduce latency and signaling overhead, the beam reporting may be activated by the event trigger request indicating an ML prediction error/failure. In other words, the event trigger request transmitted by the UE may activate the beam-measurement-based procedure (or the beam reporting). The triggering event may have a local impact in time and/or space, where the beam reporting (or triggered reporting) may be deactivated after certain conditions are satisfied. For example, the beam reporting may be deactivated based at least in part on the UE moving out of an error region (e.g., a monitored error becomes relatively small), the ML model for beam prediction being updated, and/or a sufficient amount of time passing (e.g., an amount of time that satisfies a threshold).

Figure 8:
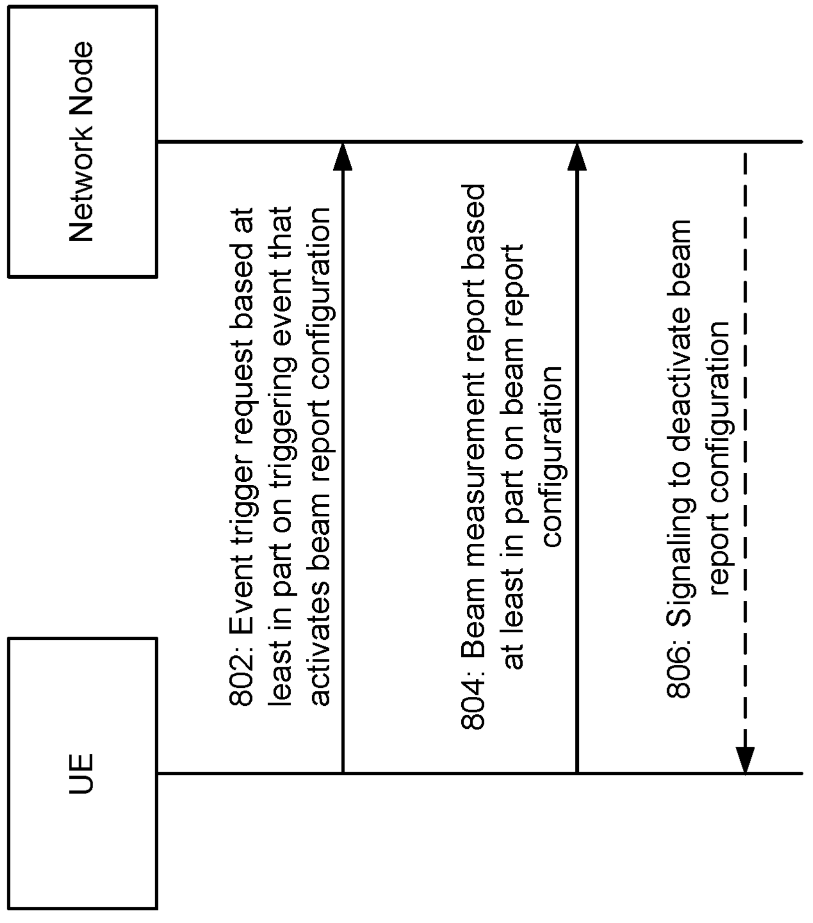
FIG. 8 is a diagram illustrating an example associated with activating a beam report configuration based at least in part on a triggering event, in accordance with the present disclosure.

FIG. 8 is a diagram illustrating an example 800 associated with activating a beam report configuration based at least in part on a triggering event, in accordance with the present disclosure. As shown in FIG. 8, example 800 includes communication between a UE (e.g., UE 120) and a network node (e.g., network node 110). In some aspects, the UE and the network node may be included in a wireless network, such as wireless network 100.

As shown by reference number 802, the UE may transmit, to the network node, an event trigger request based at least in part on an occurrence of a triggering event. The triggering event may occur based at least in part on an amount of error associated with an output of an ML model for beam prediction satisfying a threshold. The ML model for beam prediction may be run at the UE. The triggering event may occur based at least in part on a confidence level associated with an output of the ML model for beam prediction satisfying a threshold.

In some aspects, the event trigger request may activate a beam report configuration at the UE in lieu of the ML model for beam prediction at the UE. The UE may temporarily deactivate or disable the ML model for beam prediction based at least in part on the event trigger request, and instead the UE may use the beam report configuration, which may be associated with a beam-measurement-based procedure. On the other hand, the ML model for beam prediction may be associated with a beam-prediction-based procedure. In some cases, the UE may not deactivate or disable the ML model for beam prediction. The ML model for beam prediction may still run and output predicted beam measurements, but the UE may not use the predicted beam measurements as long as the beam report configuration is activated. The beam report configuration may indicate a CSI-RS configuration that indicates a preconfigured CSI-RS resource to be triggered based at least in part on the event trigger request. The beam report configuration may indicate a CSI report configuration that indicates a layer 1 (L1) report for beam measurement to be triggered based at least in part on the event trigger request.

In some aspects, the UE may transmit, to the network node, the event trigger request, and the request may activate/trigger the beam report configuration at the UE. The beam report configuration may be associated with a beam reporting, which may be associated with the beam-measurement-based procedure. The UE may transition between the beam-prediction-based procedure to the beam-measurement-based procedure based at least in part on the event trigger request. The beam report configuration may include the CSI-RS configuration and the CSI report configuration. The CSI-RS configuration may indicate certain pre-configured CSI-RS resources, which may be triggered based at least in part on the event trigger request. The CSI report configuration may indicate that a certain L1 report for beam measurement may be triggered based at least in part on the event trigger request. The triggered beam report configuration may be deactivated autonomously, or the triggered beam report configuration may be deactivated based at least in part on signaling from the network node.

In some aspects, the UE may transmit the event trigger request based at least in part on the triggering event (e.g., due to an ML model for beam prediction failure). The triggering event may be a relatively large error observed in an output of the ML model for beam prediction. The error associated with the output of the ML model for beam prediction may satisfy a threshold, which may cause the UE to transmit the event trigger request. Alternatively, the output of the ML model for beam prediction may indicate a low prediction confidence, which may trigger a fallback to the beam-measurement-based procedure (or beam reporting).

In some aspects, the triggering event and the beam measurement report, which may be based at least in part on the triggering event, may be on a per-beam basis. The triggering event and a corresponding triggered beam measurement and report may be per beam. For example, the triggering event and the corresponding triggered beam measurement and report may only be for reference signals corresponding to beams with relatively large prediction errors.

As shown by reference number 804, the UE may transmit, to the network node, a beam measurement report based at least in part on the beam report configuration. The beam measurement report may be a periodic beam measurement report, a semi-persistent beam measurement report, or an aperiodic beam measurement report. In some aspects, the UE may receive, from the network node, an acknowledgement (ACK) in response to the event trigger request. The UE may receive, from the network node, the ACK based at least in part on the network node receiving the event trigger request. The UE may transmit the beam measurement report based at least in part on the receipt of the ACK. In other words, the UE may start transmitting triggered beam reports to the network node after receiving the ACK to the event trigger request.

In some aspects, the triggering event associated with activating the beam report configuration may be a first triggering event. The beam report configuration may be deactivated at the UE based at least in part on an occurrence of a second triggering event. After the beam report configuration is deactivated, the ML model for beam prediction may be used at the UE. The second triggering event may occur based at least in part on an amount of error associated with an output of the ML model for beam prediction satisfying a threshold. The second triggering event may occur based at least in part on the UE moving to a different location. The second triggering event may occur based at least in part on an updated ML model for beam prediction being available for use at the UE. The second triggering event may occur based at least in part on a period of time satisfying a threshold. The second triggering event may occur based at least in part on a quantity of triggered beam measurement reports. For example, after the UE transmits X triggered beam measurement reports, the second triggering event may occur, which may cause the UE to stop transmitting triggered beam measurement reports. In some aspects, the UE may receive, from the network node, signaling to deactivate the beam report configuration at the UE. Alternatively, the UE may autonomously deactivate the beam report configuration based at least in part on the occurrence of the second triggering event.

In some aspects, triggered beam measurements and reporting may be periodic, semi-persistent, or aperiodic. An ML model failure may be local in time, or may be specific to certain UE locations. In some aspects, a triggered report (or triggered beam measurement and reporting) may be deactivated again when the UE moves out of a failure zone, or based at least in part on the ML model for beam prediction being updated. When the UE deactivates the triggered report, the UE may no longer perform the beam-measurement-based procedure (or beam reporting), and instead may revert back to the beam-prediction-based procedure.

In some aspects, the network node may transmit, to the UE, the signaling to deactivate the triggered report. The network node may transmit deactivation signaling, which may be signaling to reconfigure the ML model for beam prediction. In some aspects, the UE may autonomously deactivate the triggered report. Triggered reports may be periodic and may be deactivated after a normal event is detected. As an example, the UE may keep monitoring the performance of the ML model for beam prediction, and when an associated error is sufficiently small to satisfy a predefined threshold, the normal event may be detected. As another example, the UE may receive the updated ML model for beam prediction. The UE may monitor the performance of the updated ML model for beam prediction, and when an associated error of the updated ML model for beam prediction is sufficiently small to satisfy a predefined threshold, the normal event may be detected. For example, when the error is smaller than X dB for Y consecutive observations, the UE may detect the normal event, and thus may autonomously deactivate the triggered report. In some aspects, a total of A reports with a B ms periodicity may be activated, where A and B may be preconfigured. The UE may report at most X occasions, but the UE may stop reporting when a certain condition is satisfied.

As shown by reference number 806, the UE may receive, from the network node, the signaling to deactivate the beam report configuration at the UE. The UE may optionally receive the signaling to deactivate the beam report configuration from the network node. Alternatively, the UE may autonomously determine to deactivate the beam report configuration without any explicit signaling from the network node.

As indicated above, FIG. 8 is provided as an example. Other examples may differ from what is described with regard to FIG. 8.

Figure 9:
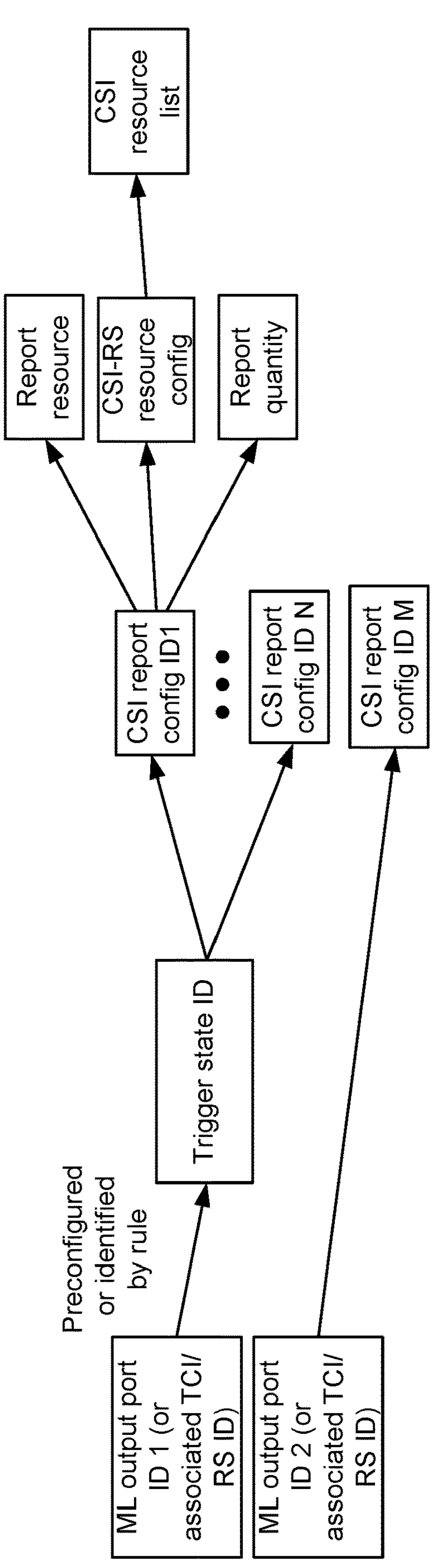
FIGS. 9-10 are diagrams illustrating examples associated with associating an additional reference signal or report with an ML model output port, in accordance with the present disclosure.

FIG. 9 is a diagram illustrating an example 900 associated with associating an additional reference signal or report with an ML model output port, in accordance with the present disclosure.

In some aspects, an additional reference signal or report may be associated with an ML model output port. Each output of an ML model for beam prediction may correspond to a different TCI or reference signal ID. When different ML model output satisfies a predefined condition, a different reference signal or report may be triggered. Each output of the ML model for beam prediction may be preconfigured to associate with a CSI report configuration ID or a trigger state ID. An association between an output of the ML model for beam prediction and a CSI report configuration or trigger state ID may be defined via RRC signaling and may be updated via a medium access control control element (MAC-CE). When an aperiodic reference signal or report is triggered, an ML model output port may be associated with a trigger state ID. When a semi-persistent or aperiodic reference signal or report is triggered, an ML model output port may be associated with a CSI report configuration ID. A trigger state or the CSI report configuration may be associated with CSI-RS or CSI report configuration.

In some aspects, a UE may receive, from a network node, a PDCCH that carries a downlink control information (DCI). The DCI may indicate a TCI state (e.g., the DCI may include a TCI indication or the DCI may include an indicated TCI state). The UE may transmit, to the network node, an acknowledgement based at least in part on the receipt of the DCI indicating the TCI state. In other words, the acknowledgement may be associated with the DCI indicating the TCI state. In some aspects, when the UE would transmit a last symbol of a physical uplink control channel (PUCCH) with hybrid automatic repeat request acknowledgement (HARQ-ACK) information corresponding to a lowest component carrier (CC) identifier (ID) in a latest occasion in which one or more DCIs carrying a TCI state indication and without downlink assignment or corresponding to a physical downlink shared channel (PDSCH) scheduling by the DCI carrying the TCI state indication, and when the indicated TCI state is different from a previously indicated TCI state, the indicated TCI state may be applied (e.g., should be applied) starting from a first slot that is at least BeamAppTime_r17 symbols after a last symbol of the PUCCH. A beam application time (BeamAppTime_r17) parameter may indicate a TCI switching time. The first slot and the BeamAppTime_r17 symbols may both be determined on an active bandwidth part (BWP) with a smallest subcarrier spacing (SCS) among carrier(s) applying the beam indication. The BeamAppTime_r17 parameter may be preconfigured via RRC signaling per BWP.

As shown in FIG. 9, an ML model output port ID 1 (or an associated TCI or reference signal ID) may be associated with a trigger state ID, which may be based at least in part on a pre-configuration or may be identified by a rule. An ML model output port ID 2 (or an associated TCI or reference signal ID) may be associated with a CSI report configuration ID M. The trigger state ID may be associated with a CSI report configuration ID 1 and a CSI report configuration ID N. The CSI report configuration ID 1 may be associated with a report resource, a CSI-RS resource configuration, and a report quantity. The CSI-RS resource configuration may be associated with a CSI resource list.

As indicated above, FIG. 9 is provided as an example. Other examples may differ from what is described with regard to FIG. 9.

Figure 10:
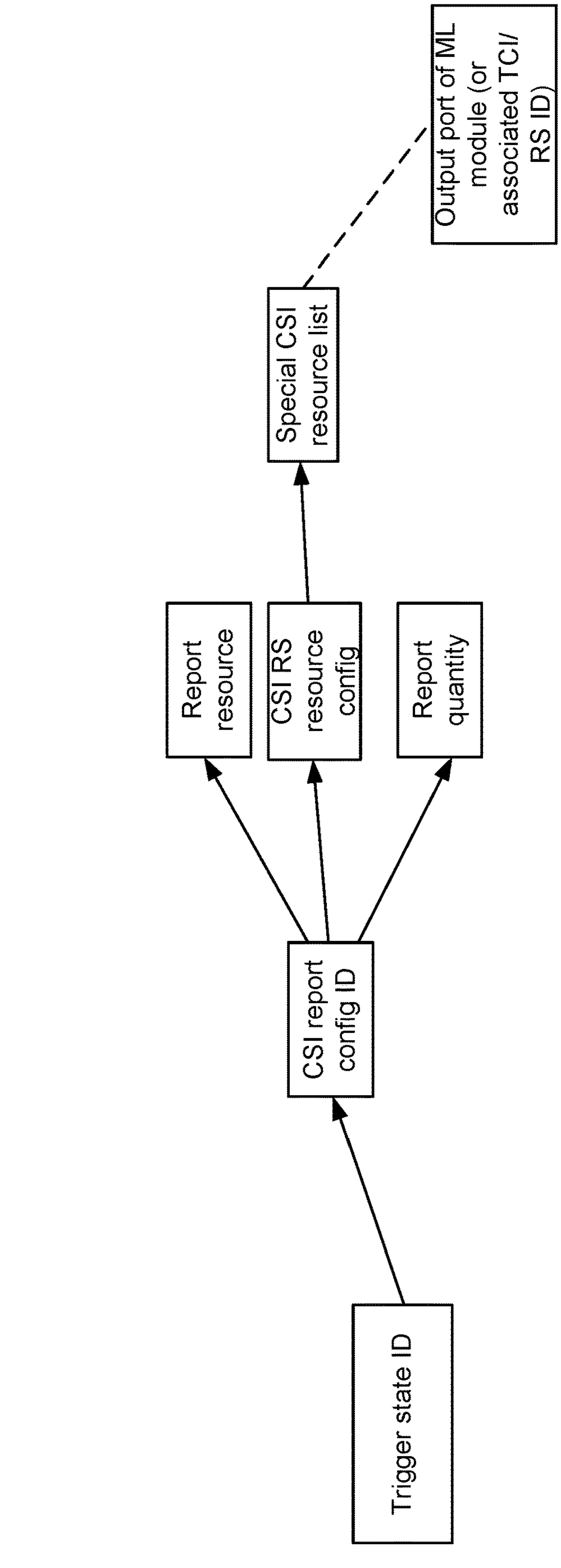

FIG. 10 is a diagram illustrating an example 1000 associated with associating an additional reference signal or report with an ML model output port, in accordance with the present disclosure.

In some aspects, an additional reference signal or report may be associated with an ML model output port. A fixed trigger state or a CSI report configuration ID may be dedicated for an event triggered report. A triggered reference signal associated with a dedicated CSI report configuration may be a special predefined CSI-RS resource set list with a floating TCI state. The floating TCI state in the special CSI-RS set resource list may be undefined. After the special predefined CSI-RS resource is triggered, TCI state(s) associated with a triggering ML model port ID may be applied to the special CSI RS resource set list.

As shown in FIG. 10, a trigger state ID may be associated with a CSI report configuration ID. The CSI report configuration ID may be associated with a report resource, a CSI-RS resource configuration, and a report quantity. The CSI-RS resource configuration may be associated with a special CSI resource list. The special CSI resource list may be associated with an output port of an ML model output port (or an associated TCI or reference signal ID).

As indicated above, FIG. 10 is provided as an example. Other examples may differ from what is described with regard to FIG. 10.

FIG. 11 is a diagram illustrating an example process 1100 performed, for example, by a UE, in accordance with the present disclosure. Example process 1100 is an example where the UE (e.g., UE 120) performs operations associated with activating a beam report configuration based at least in part on a triggering event.

As shown in FIG. 11, in some aspects, process 1100 may include transmitting, to a network node, an event trigger request based at least in part on an occurrence of a triggering event, the event trigger request activating a beam report configuration at a UE in lieu of an ML model for beam prediction at the UE (block 1110). For example, the UE (e.g., using transmission component 1304, depicted in FIG. 13) may transmit, to a network node, an event trigger request based at least in part on an occurrence of a triggering event, the event trigger request activating a beam report configuration at a UE in lieu of an ML model for beam prediction at the UE, as described above.

As further shown in FIG. 11, in some aspects, process 1100 may include transmitting, to the network node, a beam measurement report based at least in part on the beam report configuration (block 1120). For example, the UE (e.g., using transmission component 1304, depicted in FIG. 13) may transmit, to the network node, a beam measurement report based at least in part on the beam report configuration, as described above.

Process 1100 may include additional aspects, such as any single aspect or any combination of aspects described below and/or in connection with one or more other processes described elsewhere herein.

In a first aspect, the triggering event occurs based at least in part on an amount of error associated with an output of the ML model for beam prediction satisfying a threshold.

In a second aspect, alone or in combination with the first aspect, the triggering event occurs based at least in part on a confidence level associated with an output of the ML model for beam prediction satisfying a threshold.

In a third aspect, alone or in combination with one or more of the first and second aspects, the beam report configuration indicates a CSI-RS configuration that indicates a preconfigured CSI-RS resource to be triggered based at least in part on the event trigger request, and a CSI report configuration that indicates an L1 report for beam measurement to be triggered based at least in part on the event trigger request.

In a fourth aspect, alone or in combination with one or more of the first through third aspects, the triggering event and the beam measurement report are on a per-beam basis.

In a fifth aspect, alone or in combination with one or more of the first through fourth aspects, process 1100 includes receiving, from the network node, an ACK in response to the event trigger request, wherein the beam measurement report is transmitted based at least in part on a receipt of the ACK.

In a sixth aspect, alone or in combination with one or more of the first through fifth aspects, the beam measurement report is a periodic beam measurement report, a semi-persistent beam measurement report, or an aperiodic beam measurement report.

In a seventh aspect, alone or in combination with one or more of the first through sixth aspects, the triggering event is a first triggering event, and the beam report configuration is deactivated at the UE based at least in part on an occurrence of a second triggering event.

In an eighth aspect, alone or in combination with one or more of the first through seventh aspects, the second triggering event occurs based at least in part on an amount of error associated with an output of the ML model for beam prediction satisfying a first threshold, the UE moving to a different location, an updated ML model for beam prediction being available for use at the UE, a period of time satisfying a second threshold, or a quantity of triggered beam measurement reports.

In a ninth aspect, alone or in combination with one or more of the first through eighth aspects, process 1100 includes receiving, from the network node, signaling to deactivate the beam report configuration at the UE.

In a tenth aspect, alone or in combination with one or more of the first through ninth aspects, the beam report configuration is autonomously deactivated by the UE based at least in part on the occurrence of the second triggering event.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
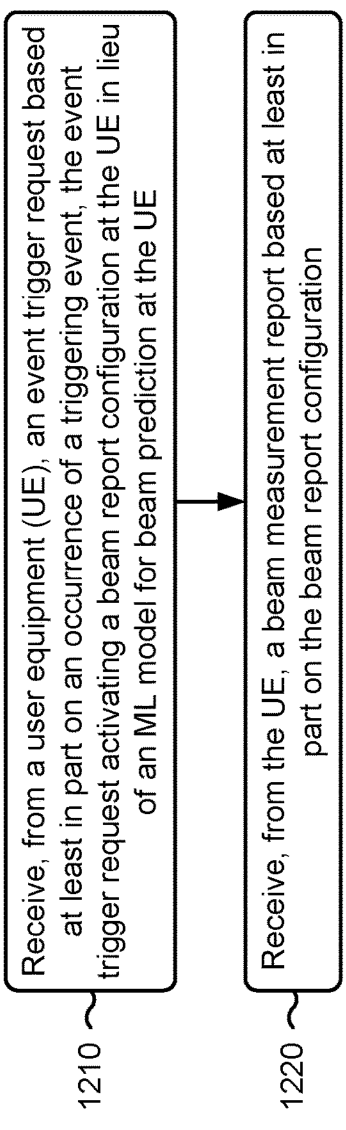

FIG. 12 is a diagram illustrating an example process 1200 performed, for example, by a network node, in accordance with the present disclosure. Example process 1200 is an example where the network node (e.g., network node 110) performs operations associated with activating a beam report configuration based at least in part on a triggering event.

As shown in FIG. 12, in some aspects, process 1200 may include receiving, from a UE, an event trigger request based at least in part on an occurrence of a triggering event, the event trigger request activating a beam report configuration at the UE in lieu of an ML model for beam prediction at the UE (block 1210). For example, the network node (e.g., using reception component 1402, depicted in FIG. 14) may receive, from a UE, an event trigger request based at least in part on an occurrence of a triggering event, the event trigger request activating a beam report configuration at the UE in lieu of an ML model for beam prediction at the UE, as described above.

As further shown in FIG. 12, in some aspects, process 1200 may include receiving, from the UE, a beam measurement report based at least in part on the beam report configuration (block 1220). For example, the network node (e.g., using reception component 1402, depicted in FIG. 14) may receive, from the UE, a beam measurement report based at least in part on the beam report configuration, as described above.

Process 1200 may include additional aspects, such as any single aspect or any combination of aspects described below and/or in connection with one or more other processes described elsewhere herein.

In a first aspect, the triggering event occurs based at least in part on an amount of error associated with an output of the ML model for beam prediction satisfying a threshold.

In a second aspect, alone or in combination with the first aspect, the triggering event occurs based at least in part on a confidence level associated with an output of the ML model for beam prediction satisfying a threshold.

In a third aspect, alone or in combination with one or more of the first and second aspects, the beam report configuration indicates a CSI-RS configuration that indicates a preconfigured CSI-RS resource to be triggered based at least in part on the event trigger request, and a CSI report configuration that indicates an L1 report for beam measurement to be triggered based at least in part on the event trigger request.

In a fourth aspect, alone or in combination with one or more of the first through third aspects, the triggering event and the beam measurement report are on a per-beam basis.

In a fifth aspect, alone or in combination with one or more of the first through fourth aspects, process 1200 includes transmitting, to the UE, an ACK in response to the event trigger request, wherein the beam measurement report is transmitted based at least in part on a receipt of the ACK.

In a sixth aspect, alone or in combination with one or more of the first through fifth aspects, the beam measurement report is a periodic beam measurement report, a semi-persistent beam measurement report, or an aperiodic beam measurement report.

In a seventh aspect, alone or in combination with one or more of the first through sixth aspects, the triggering event is a first triggering event, and the beam report configuration is deactivated at the UE based at least in part on an occurrence of a second triggering event.

In an eighth aspect, alone or in combination with one or more of the first through seventh aspects, the second triggering event occurs based at least in part on an amount of error associated with an output of the ML model for beam prediction satisfying a first threshold, the UE moving to a different location, an updated ML model for beam prediction being available for use at the UE, a period of time satisfying a second threshold, or a quantity of triggered beam measurement reports.

In a ninth aspect, alone or in combination with one or more of the first through eighth aspects, process 1200 includes transmitting, to the UE, signaling to deactivate the beam report configuration at the UE.

In a tenth aspect, alone or in combination with one or more of the first through ninth aspects, the beam report configuration is autonomously deactivated by the UE based at least in part on the occurrence of the second triggering event.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
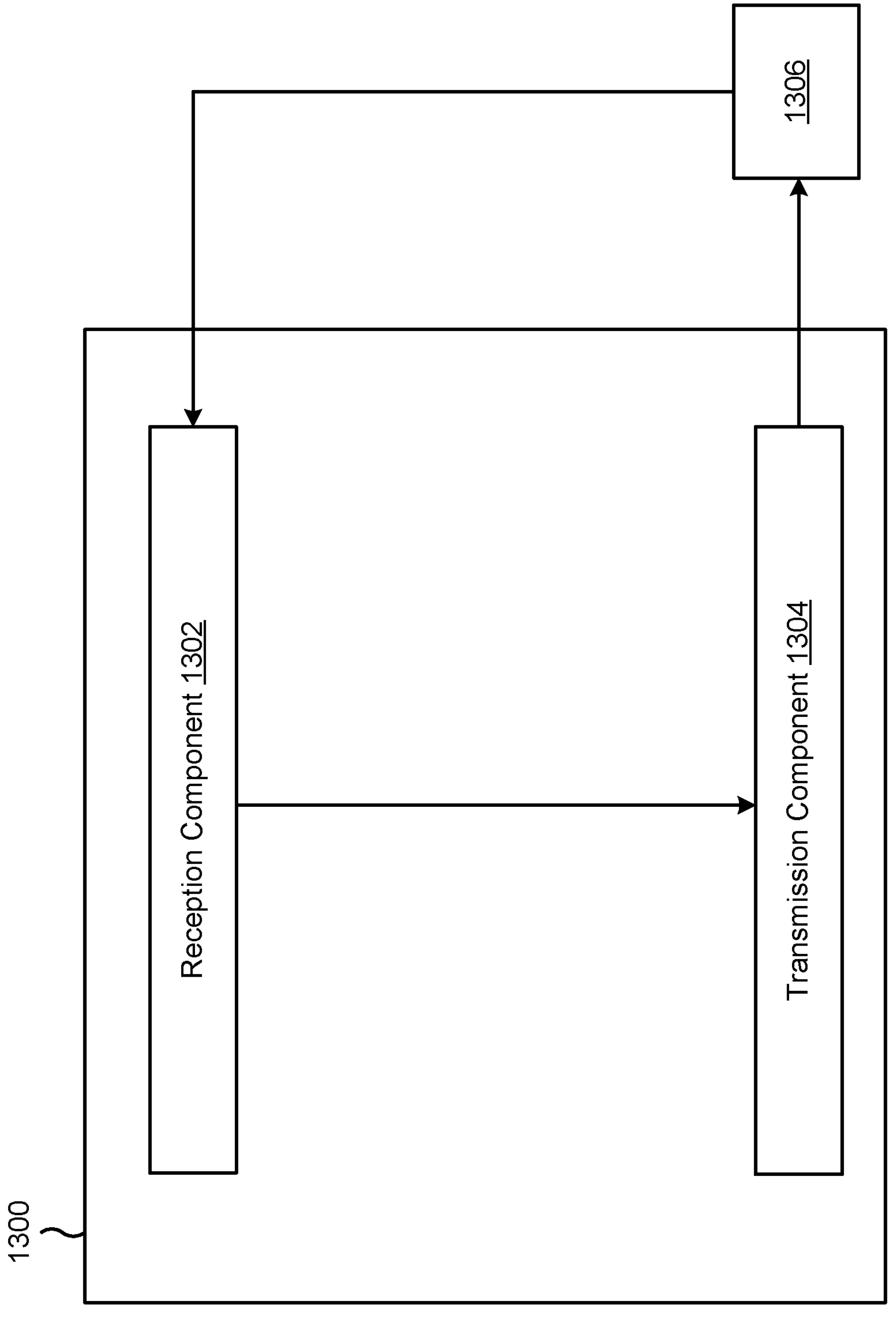
FIGS. 13-14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The transmission component 1304 may transmit, to a network node, an event trigger request based at least in part on an occurrence of a triggering event, the event trigger request activating a beam report configuration at the UE in lieu of an ML model for beam prediction at the UE. The transmission component 1304 may transmit, to the network node, a beam measurement report based at least in part on the beam report configuration. The reception component 1302 may receive, from the network node, an ACK in response to the event trigger request, wherein the beam measurement report is transmitted based at least in part on a receipt of the ACK. The reception component 1302 may receive, from the network node, signaling to deactivate the beam report configuration at the UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
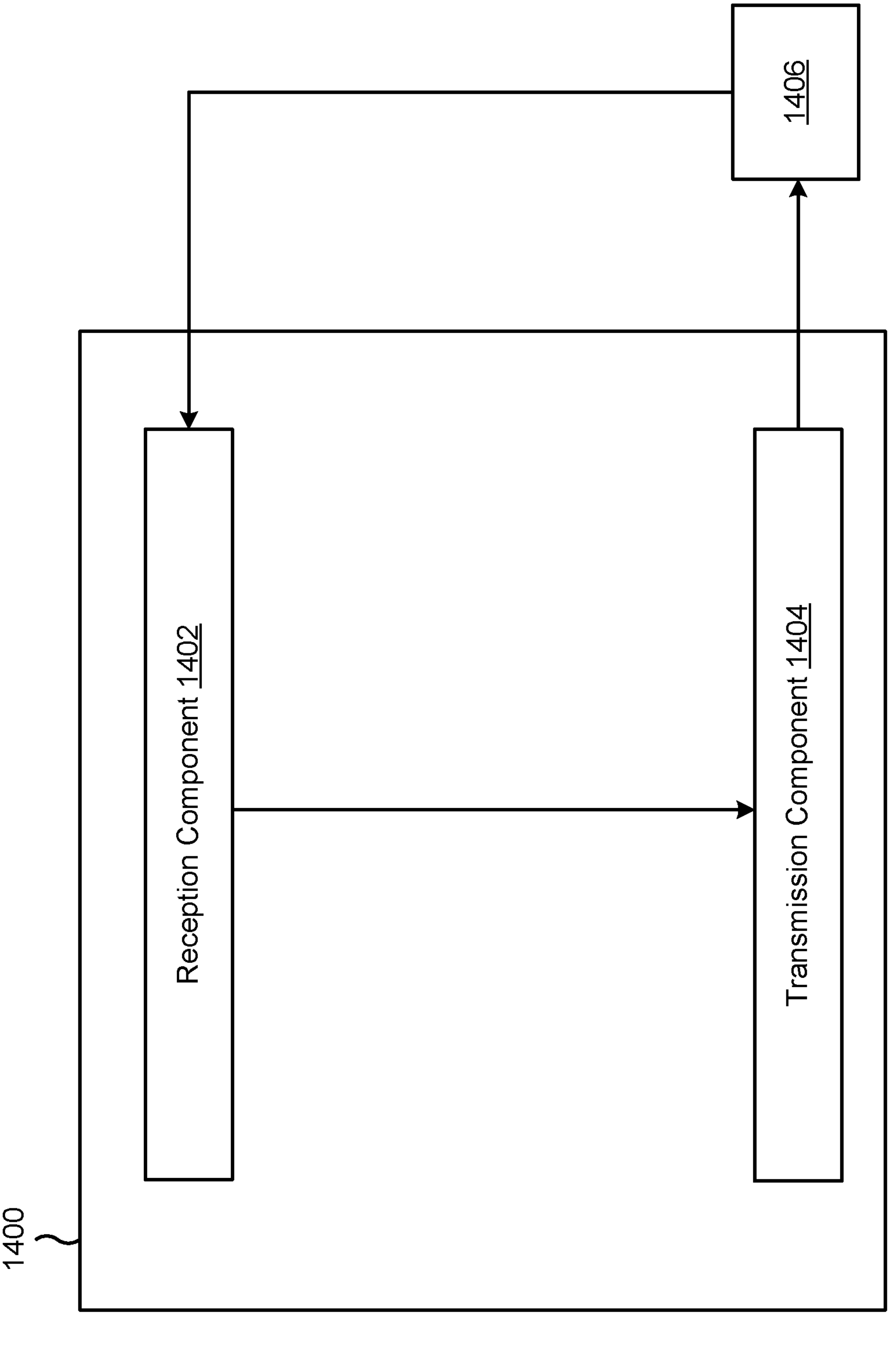

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The reception component 1402 may receive, from a UE, an event trigger request based at least in part on an occurrence of a triggering event, the event trigger request activating a beam report configuration at the UE in lieu of an ML model for beam prediction at the UE. The reception component 1402 may receive, from the UE, a beam measurement report based at least in part on the beam report configuration. The transmission component 1404 may transmit, to the UE, an ACK in response to the event trigger request, wherein the beam measurement report is transmitted based at least in part on a receipt of the ACK. The transmission component 1404 may transmit, to the UE, signaling to deactivate the beam report configuration at the UE.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by an apparatus of a user equipment (UE), comprising: transmitting, to a network node, an event trigger request based at least in part on an occurrence of a triggering event, the event trigger request activating a beam report configuration at the UE in lieu of a machine learning (ML) model for beam prediction at the UE; and transmitting, to the network node, a beam measurement report based at least in part on the beam report configuration.

Aspect 2: The method of Aspect 1, wherein the triggering event occurs based at least in part on an amount of error associated with an output of the ML model for beam prediction satisfying a threshold.

Aspect 3: The method of any of Aspects 1 through 2, wherein the triggering event occurs based at least in part on a confidence level associated with an output of the ML model for beam prediction satisfying a threshold.

Aspect 4: The method of any of Aspects 1 through 3, wherein the beam report configuration indicates: a channel state information reference signal (CSI-RS) configuration that indicates a preconfigured CSI-RS resource to be triggered based at least in part on the event trigger request; and a channel state information (CSI) report configuration that indicates a layer 1 report for beam measurement to be triggered based at least in part on the event trigger request.

Aspect 5: The method of any of Aspects 1 through 4, wherein the triggering event and the beam measurement report are on a per-beam basis.

Aspect 6: The method of any of Aspects 1 through 5, further comprising: receiving, from the network node, an acknowledgement (ACK) in response to the event trigger request, wherein the beam measurement report is transmitted based at least in part on a receipt of the ACK.

Aspect 7: The method of any of Aspects 1 through 6, wherein the beam measurement report is a periodic beam measurement report, a semi-persistent beam measurement report, or an aperiodic beam measurement report.

Aspect 8: The method of any of Aspects 1 through 7, wherein the triggering event is a first triggering event, and wherein the beam report configuration is deactivated at the UE based at least in part on an occurrence of a second triggering event.

Aspect 9: The method of Aspect 8, wherein the second triggering event occurs based at least in part on: an amount of error associated with an output of the ML model for beam prediction satisfying a first threshold; the UE moving to a different location; an updated ML model for beam prediction being available for use at the UE; a period of time satisfying a second threshold; or a quantity of triggered beam measurement reports.

Aspect 10: The method of Aspect 8, further comprising: receiving, from the network node, signaling to deactivate the beam report configuration at the UE.

Aspect 11: The method of Aspect 8, wherein the beam report configuration is autonomously deactivated by the UE based at least in part on the occurrence of the second triggering event.

Aspect 12: A method of wireless communication performed by an apparatus of a network node, comprising: receiving, from a user equipment (UE), an event trigger request based at least in part on an occurrence of a triggering event, the event trigger request activating a beam report configuration at the UE in lieu of a machine learning (ML) model for beam prediction at the UE; and receiving, from the UE, a beam measurement report based at least in part on the beam report configuration.

Aspect 13: The method of Aspect 12, wherein the triggering event occurs based at least in part on an amount of error associated with an output of the ML model for beam prediction satisfying a threshold.

Aspect 14: The method of any of Aspects 12 through 13, wherein the triggering event occurs based at least in part on a confidence level associated with an output of the ML model for beam prediction satisfying a threshold.

Aspect 15: The method of any of Aspects 12 through 14, wherein the beam report configuration indicates: a channel state information reference signal (CSI-RS) configuration that indicates a preconfigured CSI-RS resource to be triggered based at least in part on the event trigger request; and a channel state information (CSI) report configuration that indicates a layer 1 report for beam measurement to be triggered based at least in part on the event trigger request.

Aspect 16: The method of any of Aspects 12 through 15, wherein the triggering event and the beam measurement report are on a per-beam basis.

Aspect 17: The method of any of Aspects 12 through 16, further comprising: transmitting, to the UE, an acknowledgement (ACK) in response to the event trigger request, wherein the beam measurement report is transmitted based at least in part on a receipt of the ACK.

Aspect 18: The method of any of Aspects 12 through 17, wherein the beam measurement report is a periodic beam measurement report, a semi-persistent beam measurement report, or an aperiodic beam measurement report.

Aspect 19: The method of any of Aspects 12 through 18, wherein the triggering event is a first triggering event, and wherein the beam report configuration is deactivated at the UE based at least in part on an occurrence of a second triggering event.

Aspect 20: The method of Aspect 19, wherein the second triggering event occurs based at least in part on: an amount of error associated with an output of the ML model for beam prediction satisfying a first threshold; the UE moving to a different location; an updated ML model for beam prediction being available for use at the UE; a period of time satisfying a second threshold; or a quantity of triggered beam measurement reports.

Aspect 21: The method of Aspect 19, further comprising: transmitting, to the UE, signaling to deactivate the beam report configuration at the UE.

Aspect 22: The method of Aspect 19, wherein the beam report configuration is autonomously deactivated by the UE based at least in part on the occurrence of the second triggering event.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
- a memory; and
- one or more processors, coupled to the memory, configured to:
  - transmit, to a network node, a beam prediction result determined using a machine learning (ML) model for beam prediction;
  - transmit, to the network node, an event trigger request based at least in part on an occurrence of a triggering event;
  - activate a beam report configuration at the UE based at least in part on the occurrence of the triggering event;
  - deactivate the ML model for beam prediction at the UE based at least in part on activation of the beam report configuration at the UE; and
  - transmit, to the network node, a beam measurement report based at least in part on the beam report configuration.

2. The apparatus of claim 1, wherein the triggering event occurs based at least in part on an amount of error associated with an output of the ML model for beam prediction satisfying a threshold.

3. The apparatus of claim 1, wherein the triggering event occurs based at least in part on a confidence level associated with an output of the ML model for beam prediction satisfying a threshold.

4. The apparatus of claim 1, wherein the beam report configuration indicates:
- a channel state information reference signal (CSI-RS) configuration that indicates a preconfigured CSI-RS resource to be triggered based at least in part on the event trigger request; and
- a channel state information (CSI) report configuration that indicates a layer 1 report for beam measurement to be triggered based at least in part on the event trigger request.

5. The apparatus of claim 1, wherein the triggering event and the beam measurement report are on a per-beam basis.

6. The apparatus of claim 1, wherein the one or more processors are further configured to:
- receive, from the network node, an acknowledgement (ACK) in response to the event trigger request, wherein the beam measurement report is transmitted based at least in part on a receipt of the ACK.

7. The apparatus of claim 1, wherein the beam measurement report is a periodic beam measurement report, a semi-persistent beam measurement report, or an aperiodic beam measurement report.

8. The apparatus of claim 1, wherein the triggering event is a first triggering event, and wherein the beam report configuration is deactivated at the UE based at least in part on an occurrence of a second triggering event.

9. The apparatus of claim 8, wherein the second triggering event occurs based at least in part on:
- an amount of error associated with an output of the ML model for beam prediction satisfying a first threshold;
- the UE moving to a different location;
- an updated ML model for beam prediction being available for use at the UE;
- a period of time satisfying a second threshold; or
- a quantity of triggered beam measurement reports.

10. The apparatus of claim 8, wherein the one or more processors are further configured to:
- receive, from the network node, signaling to deactivate the beam report configuration at the UE.

11. The apparatus of claim 8, wherein the beam report configuration is autonomously deactivated by the UE based at least in part on the occurrence of the second triggering event.

12. An apparatus for wireless communication at a network node, comprising:
- a memory; and
- one or more processors, coupled to the memory, configured to:
  - receive, from a user equipment (UE), a beam prediction result determined using a machine learning (ML) model for beam prediction;
  - receive, from the UE, an event trigger request based at least in part on an occurrence of a triggering event, wherein the event trigger request indicates activation of a beam report configuration at the UE based at least in part on the occurrence of the triggering event and deactivation of the ML model for beam prediction at the UE based at least in part on the activation of the beam report configuration at the UE; and receive, from the UE, a beam measurement report based at least in part on the beam report configuration.

13. The apparatus of claim 12, wherein the triggering event occurs based at least in part on an amount of error associated with an output of the ML model for beam prediction satisfying a threshold.

14. The apparatus of claim 12, wherein the triggering event occurs based at least in part on a confidence level associated with an output of the ML model for beam prediction satisfying a threshold.

15. The apparatus of claim 12, wherein the beam report configuration indicates:

a channel state information reference signal (CSI-RS) configuration that indicates a preconfigured CSI-RS resource to be triggered based at least in part on the event trigger request; and a channel state information (CSI) report configuration that indicates a layer 1 report for beam measurement to be triggered based at least in part on the event trigger request.

16. The apparatus of claim 12, wherein the triggering event and the beam measurement report are on a per-beam basis.

17. The apparatus of claim 12, wherein the one or more processors are further configured to:

transmit, to the UE, an acknowledgement (ACK) in response to the event trigger request, wherein the beam measurement report is transmitted based at least in part on a receipt of the ACK.

18. The apparatus of claim 12, wherein the beam measurement report is a periodic beam measurement report, a semi-persistent beam measurement report, or an aperiodic beam measurement report.

19. The apparatus of claim 12, wherein the triggering event is a first triggering event, and wherein the beam report configuration is deactivated at the UE based at least in part on an occurrence of a second triggering event.

20. The apparatus of claim 19, wherein the second triggering event occurs based at least in part on:

an amount of error associated with an output of the ML model for beam prediction satisfying a first threshold;

the UE moving to a different location;

an updated ML model for beam prediction being available for use at the UE;

a period of time satisfying a second threshold; or a quantity of triggered beam measurement reports.

21. The apparatus of claim 19, wherein the one or more processors are further configured to:

transmit, to the UE, signaling to deactivate the beam report configuration at the UE.

22. The apparatus of claim 19, wherein the beam report configuration is autonomously deactivated by the UE based at least in part on the occurrence of the second triggering event.

23. A method of wireless communication performed by an apparatus of a user equipment (UE), comprising:

transmitting, to a network node, a beam prediction result determined using a machine learning (ML) model for beam prediction;

transmitting, to the network node, an event trigger request based at least in part on an occurrence of a triggering event;

activating a beam report configuration at the UE based at least in part on the occurrence of the triggering event;

deactivating the ML model for beam prediction at the UE based at least in part on activating the beam report configuration at the UE; and transmitting, to the network node, a beam measurement report based at least in part on the beam report configuration.

24. The method of claim 23, wherein the triggering event occurs based at least in part on an amount of error associated with an output of the ML model for beam prediction satisfying a threshold.

25. The method of claim 23, wherein the triggering event occurs based at least in part on a confidence level associated with an output of the ML model for beam prediction satisfying a threshold.

26. The method of claim 23, wherein the triggering event is a first triggering event, and wherein the beam report configuration is deactivated at the UE based at least in part on an occurrence of a second triggering event.

27. A method of wireless communication performed by an apparatus of a network node, comprising:

receiving, from a user equipment (UE), a beam prediction result determined using a machine learning (ML) model for beam prediction;

receiving, from the UE, an event trigger request based at least in part on an occurrence of a triggering event, wherein the event trigger request indicates activating a beam report configuration at the UE based at least in part on the occurrence of the triggering event and deactivating the ML model for beam prediction at the UE based at least in part on activating the beam report configuration at the UE; and receiving, from the UE, a beam measurement report based at least in part on the beam report configuration.

28. The method of claim 27, wherein the triggering event occurs based at least in part on an amount of error associated with an output of the ML model for beam prediction satisfying a threshold.

29. The method of claim 27, wherein the triggering event occurs based at least in part on a confidence level associated with an output of the ML model for beam prediction satisfying a threshold.

30. The method of claim 27, wherein the triggering event is a first triggering event, and wherein the beam report configuration is deactivated at the UE based at least in part on an occurrence of a second triggering event.

* * * * *